United States Patent Office 3,518,222
Patented June 30, 1970

3,518,222
CURABLE SILICONE COMPOSITIONS CONTAINING CERTAIN ACIDIC FILLERS
Leon J. Ostrowski, Midland, Mich., assignor to Dow Corning Corporation, Midland, Mich., a corporation of Michigan
No Drawing. Filed May 27, 1968, Ser. No. 732,083
Int. Cl. C08g 51/04; C08k 1/02
U.S. Cl. 260—37       30 Claims

ABSTRACT OF THE DISCLOSURE

A mixture of a hydroxylated organosilicon polymer, an acidic filler such as molybdenum disulfide or zinc sulfide and triethylene diamine or 2-ethyl-4-methylimidazole is disclosed as a curable mixture which can find use as a molding compound.

---

This invention relates to a curable hydroxylated organosilicon polymer composition containing certain acidic fillers.

It is known that hydroxylated containing silicone polymers can be cured by using acidic and basic catalysts. It is also known that certain metal salts of carboxylic acids can be used to cure silicon polymers having hydroxyl radicals. Amines and amine salts have also been used to cure silicone polymers having silanols. The metal salts of carboxylic acids have been particularly known for their utility as catalysts for curing silanol containing organosilicon polymers. A catalyst particularly useful in curing molding compositions containing silanol containing organosilicon polymers is described in U.S. Letters Pat. No. 3,208,961 in which a combination of a lead oxide or lead carbonate with carboxylic acid or an ammonium salt of a carboxylic acid is described. However, it has been found that this catalytic combination, as well as other catalysts, is not suitable for curing silanol containing organosilicon polymers when certain acidic fillers are present.

It is therefore an object of the present invention to provide a curable composition of a silanol containing organosilicon polymer and certain acidic fillers.

The present invention relates to a curable composition consisting essentially of (A) an organosilicon polymer having silicon atoms linked by divalent radicals selected from the group consisting of divalent oxygen atoms, divalent hydrocarbon radicals, divalent halogenated hydrocarbon radicals, divalent ether containing hydrocarbon radicals, and divalent ether containing halogenated hydrocarbon radicals, said divalent ether containing radicals being bonded to the silicon atoms by silicon-carbon bonds, at least 0.25 weight percent of the organosilicon polymer being hydroxyl radicals bonded to silicon atoms and any remaining unsatisfied valences of the silicon atoms being satisfied by monovalent organic radicals selected from the group consisting of hydrocarbon radicals, halogenated hydrocarbon radicals, cyanoalkyl radicals, ether containing hydrocarbon radicals and ether containing halogenated hydrocarbon radicals, said monovalent ether containing radicals being bonded to the silicon atoms through silicon-carbon bonds, there being an average of at least 0.75 monovalent organic radicals per silicon atom, (B) an acidic filler selected from the group consisting of molybdenum disulfide, zinc sulfide, boron nitride, tungsten disulfide, zinc oxide, nickel powder, aluminum powder, zinc powder, bronze powder, copper powder, stainless steel powder and mixtures thereof, (A) being present in an amount of from 3 to 90 weight percent based on the total weight of (A) and (B), and (B) being present in an amount of from 10 to 97 weight percent based on the total weight of (A) and (B), and (C) a compound selected from the group consisting of triethylenediamine and 2-ethyl-4-methylimidazole, (C) being present in an amount of from 0.1 to 10 weight percent based on the weight of (A).

The hydroxylated organosilicon polymers (A) are well known in the art and many can be purchased commercially. The hydroxylated organosilicon polymers suitable for the present invention must have at least 0.25 weight percent silicon-bonded hydroxyl radicals and at least 0.75 monovalent organic radicals per silicon atom. The hydroxylated organosilicon polymers (A) can be homopolymers, copolymers, monomers and mixtures thereof. The hydroxylated organosilicon polymers (A) can be fluids, solids, gums, resins or mixtures thereof. The hydroxylated organosilicon polymers (A) can be illustrated by hydroxy-endblocked linear molecules such as the hydroxy-endblocked diorganopolysiloxanes, branched hydroxylated organopolysiloxanes, cyclic hydroxylated organopolysiloxanes, three-dimensional hydroxylated organopolysiloxane such as the resins. The hydroxylated organosilicon polymers (A) can have units of the formulae $R_3SiO_{0.5}$,   $R_2SiO$,   $RSiO_{1.5}$,   $SiO_2$,   $R_2Si(OH)O_{0.5}$, $RSi(OH)O$,  $Si(OH)O_{1.5}$,  $O_{0.5}R_2SiR'SiRO_{0.5}$ $ORSiR'SiRO$,  $O_{1.5}SiR'SiO_{1.5}$,  $O_{0.5}R_2SiR'SiO$ $O_{0.5}RSiR'SiO_{1.5}$,  $O_{0.5}(OH)RSiR'SiR_2O_{0.5}$ and the like.

The hydroxylated organosilicon polymers (A) can also contain hydroxylated organosilicon monomers mixed with any hydroxylated organosilicon polymer. The hydroxylated organosilicon monomers can include $R_3Si(OH)$, $R_2Si(OH)_2$, $RSi(OH)_3$, $HOR_2SiR'SiR_2OH$ $(HO)_2RSiR'SiR_2(OH)$,  $R_3SiR'SiR_2OH$ and $$HOR_2Si-R'-SiR_2OH$$
$$\underset{SiR_2OH}{|}$$

and the like.

In the above formulae, R is a monovalent organic radical and R' is a divalent organic radical. R can be briefly illustrated by the monovalent organic radicals such as the monovalent hydrocarbon radicals, methyl, ethyl, isopropyl, phenyl, myricyl, vinyl, cyclohexyl, benzyl, and tolyl; monovalent halogenated hydrocarbon radicals such as perchlorophenyl, 2-bromonaphthyl, 3,3,3-trifluoropropyl, $\alpha,\alpha,\alpha$-trifluorotolyl and p-iodophenylethyl, cyanoalkyl radicals such as gamma-cyanopropyl; monovalent ether containing hydrocarbon radicals such as

—$CH_2CH_2OCH_2CH_3$

—$CH_2(OCH_2CH_2)_2OCH_3$ and —$CH_2CH_2CH_2OCH_2C_6H_5$; and monovalent ether containing halogenated hydrocarbon radicals such as —$CH_2CH_2OCF_2CF_3$ and —$CH_2CH_2CH_2O\,CH_2CH_2CH_2$—⟨ ⟩—Cl R' can be briefly illustrated by the polyvalent organic radicals such as the divalent hydrocarbon radicals such as methylene, ethylene, cyclohexylene, phenylene, and tolylene; the divalent halogenated hydrocarbon radicals such as —$CH_2CH_2CHFCH_2CH_2$—, —$CH_2$—⟨ ⟩—$CH_2$—
    |
    Br and iodophenylene; the divalent ether containing hydrocarbon radicals such as —$CH_2CH_2OCH_2$—,

—$CH_2CH_2(OCH_2CH_2)_2OCH_2CH_2$— and —C$_6$H$_4$OC$_6$H$_4$—; the divalent ether containing halogenated hydrocarbon radicals such as

—CH$_2$CH$_2$CF$_2$CH$_2$OCH$_2$— and

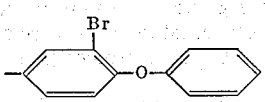

Further explanation and methods of preparation of the hydroxylated organosilicon polymers can be found in U.S. Letters Patents Nos. 2,863,897; 2,902,468; 3,160,601; 3,179,678; 3,208,961; 3,268,570; 3,274,145; 3,274,153; 3,328,448 and 3,350,349. These patents describe methods of preparation and also describe the hydroxylated organosilicon polymers in greater detail.

The acidic fillers (B) are those fillers which have acid properties and which prevent a satisfactory cure when used in admixture with a hydroxylated organosilicon polymer (A). The acidic fillers (B) are all well known materials and can all be purchased commercially and include molybdenum disulfide, zinc sulfide, boron nitride, tungsten disulfide, zinc oxide, nickel powder, aluminum powder, zinc powder, bronze powder, copper powder and stainless steel powder. These acidic fillers can be used in any combination.

The acidic fillers (B) need not be the only fillers present, but other conventional fillers can be used in admixture therewith. Some conventional fillers include the well known fillers such as silica, both treated and untreated, titanium dioxide, aluminum oxide, diatomaceous earth, crushed quartz, glass fillers, iron oxide, graphite, carbon black, clays and the like. These conventional fillers can be mixed with the acidic fillers (B) such that the conventional fillers provide up to 75 weight percent of the total filler mixture, preferably the conventional fillers are used in amounts up to 50 weight percent of the total filler mixture.

The third component of the present curable composition is compound (C). This compound can be either triethylenediamine,

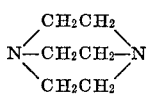

or 2-ethyl-4-methylimidazole,

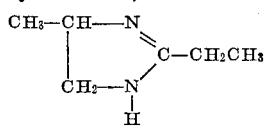

Both the triethylenediamine and the 2-ethyl-4-methylimidazole can be purchased commercially.

The present curable composition can be prepared by mixing in any convenient manner 3 to 90 weight percent of the hydroxylated organosilicon polymer (A) based on the weight of (A) and (B), 10 to 97 weight percent of the acidic filler (B) based on the weight of (A) and (B) and 0.1 to 10 weight percent of (C) based on the weight of (A). The preferred amounts are 5 to 50 weight percent of (A) based on the weight of (A) and (B), 50 to 95 weight percent of (B) based on the weight percent of (A) and (B) and 0.2 to 5 weight percent of (C) based on the weight of (A).

The methods of mixing components (A), (B) and (C) include hand mixing, machine mixing by such means as hot or cold milling, or any other conventional mixing means. The preferred method of mixing the ingredients is milling. The order of mixing is not critical. The preferred order is to mill (A) and (B) together to obtain a homogeneous mixture and then mill (C) into the mixture of (A) and (B).

The most preferred hydroxylated organosilicon polymers are the organopolysiloxanes, having the silicon atoms linked by divalent oxygen atoms, and the preferred monovalent organic radicals are methyl, vinyl, ethyl, isopropyl and phenyl. It is preferred that the organosilicon polymers have an average of at least one monovalent organic group per silicon atom and at least one weight percent silicon-bonded hydroxyl radicals. The most preferred acidic fillers are molybdenum disulfide, boron nitride and zinc sulfide. Triethylenediamine is the preferred catalyst.

Compound (C) can be used with other conventional curing catalysts such as lead oxide, lead carbonate, ammonium salts of carboxylic acid and carboxylic acids among others.

Organic polymers can also be used in combination with the hydroxylated organosilicon polymers (A), such as phenolic resins, polytetrafluoroethylene, alkyds, epoxy resins and the like.

Molding compounds can be prepared from the curable compositions of this invention when the hydroxylated organosilicon polymer (A) is an organosilicon resin, preferably an organopolysiloxane resin having from 1 to 1.7 monovalent organic radicals per silicon atom, particularly where the monovalent organic radicals are both methyl and phenyl radicals. Elastomeric and rubbery products can be prepared from the curable compositions of this invention when the hydroxylated organosilicon polymer (A) is essentially a diorganopolysiloxane which is hydroxyl endblocked. Thus, this invention can be used to prepare hard resin products such as molded articles, or elastomeric products such as rubbery products or any of a variety of properties therebetween. The curable compositions of this invention can be used as potting compounds, caulking compounds, adhesives and the like. When molybdenum disulfide, zinc sulfide, and tungstun disulfide are used as fillers the curable composition of this invention can be used to make bonded solid lubricants. These and many other uses will be apparent to those skilled in the art from the disclosure of this invention.

The following examples are illustrative only and should not be construed as limiting the present invention which is properly delineated in the appended claims.

Example 1

A mixture of 20 parts by weight of a hydroxylated organopolysiloxane resin composed of 45 mole percent of monomethylsiloxane units, 40 mole percent monophenylsiloxane units, 5 mole percent methylphenylsiloxane units and 10 mole percent diphenylsiloxane units and having 7 weight percent silicon-bonded hydroxyl radicals, 39.5 parts by weight molybdenum disulfide, 39.5 parts by weight zinc sulfide and 1 part by weight calcium stearate was prepared by blending with a spatula. This mixture was then milled for 5 minutes on a two-roll rubber mill having one roll at 200° F. and one roll at 60° F. One part by weight triethylenediamine was added to the mixture which was then milled for 3 minutes on the two-roll mill to provide a homogeneous mixture. The milled mixture was then ground and compression molded at 350° F. for 10 minutes in 0.5 inch by 0.25 inch by 5 inch disc. The disc was post cured for 2 hours at 350° F., 400° F., 450° F. and 500° F. The cured test specimen was tested according to ASTM procedures D–7–90 (flexural strength) and D–6–95, FIG. 1 (compressive strength). The compressive strength of the cured tested specimen was 6130 p.s.i. and the flexural strength was 3440 p.s.i.

Example 2

(A) A mixture was prepared, molded and tested as described in Example 1, except 0.2 part by weight of triethylenediamine was used instead of 1.0 part by weight. The cured test specimens had a compressive strength of 7550 p.s.i. and a flexural strength of 3180 p.s.i.

(B) A mixture was prepared, molded and tested as described in Example 1 except 0.4 part by weight triethylenediamine was used instead of 1.0 part by weight and the milling of the mixture before the addition of the triethylenediamine was 4 minutes and the milling of the mixture after the addition of the triethylenediamine was 2 minutes. The cured test specimens had a compressive strength of 7560 p.s.i. and a flexural strength of 2940 pounds.

Example 3

A mixture was prepared, molded and tested as described in Example 1 except 0.4 part by weight of 2-ethyl-4-methylimidazole was used instead of 1.0 part by weight triethylenediamine and the milling before the addition of the 2-ethyl-4-methylimidazole was 4 minutes. The cured test specimen had a compressive strength of 4687 p.s.i. and a flexural strength of 2310 p.s.i.

Example 4

A mixture of 10 parts by weight of the hydroxylated organopolysiloxane resin as described in Example 1, 39.5 parts by weight molybdenum disulfide, 39.5 parts of zinc sulfide, 1 part by weight zinc stearate, 10 parts by weight diallyl isophthalate resin, 0.3 part by weight dicumyl peroxide and 0.03 part by weight triethylenediamine was prepared by blending with a spatula. This mixture was then put through a 100 mesh screen in a hammer mill. The dry blended powder was then passed through a tight nip of a cold two-roll mill. The test specimen was then molded as described in Example 1, except it was post cured for 2 hours at 400° F. The cured test specimen had a compressive strength of 7830 p.s.i. and a flexural strength of 4430 p.s.i.

Example 5

A mixture of 7.4 parts by weight of the hydroxylated organopolysiloxane resin as described in Example 1, 36 parts by weight zinc sulfide, 1 part by weight zinc stearate, 2 parts by weight carnauba wax, 10.8 parts by weight

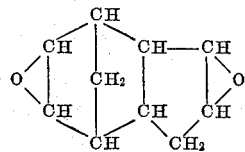

4 parts by weight

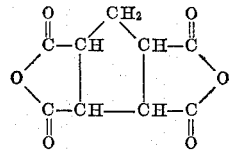

and 0.148 part by weight triethylenediamine was prepared by mixing thoroughly with a spatula and then milling on a hot two roll mill for three minutes. The mill is described in Example 1. The mixture cured to a hard solid when molded as described in Example 1.

Example 6

Similar results were obtained when Example 5 was repeated, except 9.4 parts of

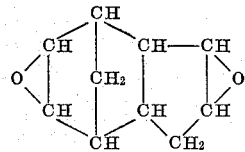

was used instead of 10.8 parts by weight, 5.45 parts by weight of

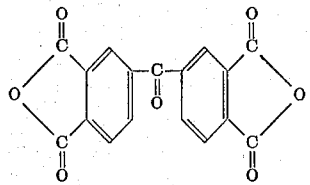

6.4 parts by weight of the hydroxylated organopolysiloxane resin as described in Example 1, and 0.128 part by weight triethylenediamine was used instead of 0.148 part by weight.

Example 7

(A) The molded test specimen of Example 2(A) was a solid bonded lubricant, which, when tested by the friction tester of U.S. Pat. No. 3,028,746, had a coefficient of friction ($\mu$) of 0.098 with a temperature increase to 166° F. where the load on the test specimen provided 580 p.s.i., with 200 r.p.m. and 72 ft. per min. Satisfactory lubricants are those which have a coefficient of friction of less than 0.2 and a temperature increase of less than 200° F. when tested under these conditions.

(B) A molded specimen was prepared as described in Example 3 except 0.2 part by weight of 2-ethyl-4-methylimidazole was used instead of 0.4 part by weight. The cured test specimen had a compressive strength of 5610 p.s.i. and a flexural strength of 3590 p.s.i. The cured test specimen was tested as a bonded solid lubricant as described in (A) above and the coefficient of friction was 0.122 with a temperature increase to 142° F.

(C) A molded specimen was prepared as described in Example 4 where the ingredients were 10 parts by weight of the hydroxylated organopolysiloxane resin as described in Example 1, 39.5 parts by weight molybdenum disulfide, 39.5 parts by weight zinc sulfide, 1 part by weight zinc stearate, 10 parts by weight of a phenolic resin and 0.3 part by weight triethylenediamine. The cured molded test specimen when post cured for 2 hours at 400° F. had a compressive strength of 8240 p.s.i. and a flexural strength of 4990 p.s.i. The test specimen was used as a bonded solid lubricant and when tested as described in (A) above had a coefficient of friction of 0.0944 with a temperature increase up to 130° F.

(D) A molded specimen was prepared as described in Example 1, where the ingredients were 20 parts by weight of the hydroxylated organopolysiloxane resin as described in Example 1, 34.5 parts by weight of molybdenum disulfide, 34.5 parts by weight zinc sulfide, 1 part by weight calcium stearate, 10 parts by weight talc and 0.2 part by weight triethylenediamine. The cured test specimen had a compressive strength of 3470 p.s.i. and a flexural strength of 1990 p.s.i.

(E) A molded specimen was prepared as described in Example 1 where the ingredients were 20 parts by weight of the hydroxylated organopolysiloxane resin as described in Example 1, 79 parts by weight molybdenum disulfide. 1 part by weight calcium stearate and 0.2 part by weight triethylenediamine. The cured test specimen had a compressive strength of 3440 p.s.i. and a flexural strength of 2690 p.s.i. The test specimen, as a bonded solid lubricant when tested as described in (A) above, had a coefficient of friction of 0.1389 with a temperature increase up to 156° F.

Example 8

For purposes of comparison the following examples are included.

(A) A molding process as described in Example 1 was used where the ingredients were 12.5 parts by weight of the hydroxylated organopolysiloxane resin as described in Example 1, 43.25 parts by weight of molybdenum disulfide, 43.25 parts by weight zinc sulfide, 1 part by weight calcium stearate, 0.1125 part lead carbonate and 0.125 part ammonium benzoate. The composition would not cure.

(B) A molding process as described in Example 1 was used where the ingredients were 10 parts by weight of the hydroxylated organopolysiloxane resin as described in Example 1, 44.5 parts by weight of molybdenum disulfide, 44.5 parts by weight zinc sulfide, 1 part by weight calcium stearate, 0.15 part by weight lead oxide and 0.13 part by weight of a mixture which is 3 parts by weight stearic acid and 1 part by weight

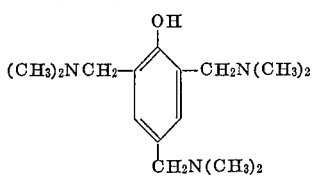

The mixture was milled 8 minutes before the lead oxide and the stearic acid mixture was added instead of 5 minutes. This mixture would not cure.

(C) A molding process as described in Example 1 was used where the ingredients were 15 parts by weight of the hydroxylated organopolysiloxane resin as described in Example 1, 42 parts by weight molybdenum disulfide, 42 parts by weight zinc sulfide, 1 part by weight calcium stearate and 0.2595 part by weight of a mixture of 43 parts by weight hexamethylenetetramine and 56 parts by weight urea. The milling time after the addition of the hexamethylenetetramine-urea mixture was six minutes instead of three minutes. This mixture was not suitable for molding since its blistered and would not release from the mold.

(D) A molding process as described in Example 1 was used where the ingredients were 15 parts by weight of the hydroxylated organopolysiloxane resin as described in Example 1, 42 parts by weight molybdenum disulfide, 42 parts by weight zinc sulfide, 1 part by weight calcium stearate, 0.405 part by weight lead carbonate and 0.45 part by weight benzoic acid. This mixture would not cure.

(E) A molding process as described in Example 1 was used where the ingredients were 17.5 parts by weight of the hydroxylated organopolysiloxane resin as described in Example 1, 40.75 parts by weight molybdenum disulfide, 40.75 parts by weight zinc sulfide, 1 part by weight calcium stearate, 0.4725 part by weight lead carbonate and 0.525 part by weight benzoic acid. The milling time after the addition of the lead carbonate and benzoic acid was 8 minutes instead of 3 minutes. This mixture would not cure.

Example 9

When the following compositions are heated to 350° F. for 30 minutes, a cured product is obtained.

(A)

20 parts by weight of a phenylmethylsiloxane resin having a $CH_3:Si$ ratio of 0.75:1, a phenyl to silicon ratio of 0.60:1, a total phenyl plus methyl to silicon ratio of 1.32:1 and 0.25 weight percent silicon-bonded hydroxyl radicals,
40 parts by weight zinc sulfide, and
2 parts by weight triethylenediamine.

(B)

80 parts by weight of a hydroxyl endblocked diorganopolysiloxane having 55 mol percent dimethylsiloxane units, 35 mol percent ethylmethylsiloxane units and 10 mol percent methyltolysiloxane units,
10 parts by weight

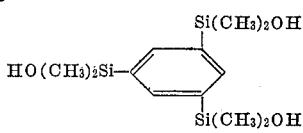

10 parts by weight boron nitride, and
0.8 part by weight triethylenediamine.

(C)

70 parts by weight of an organosilicon polymer having 10 mol percent

units, 40 mol percent 3,3,3 - trifluoropropylmethylsiloxane units, 30 ml. percent dimethylsiloxane units, 10 mol percent methylphenylsiloxane units and 10 mol percent

units,
5 parts by weight monophenylsilanetriol,
25 parts by weight zinc oxide, and
0.075 part by weight 2-ethyl-4-methylimidazole.

(D)

50 parts by weight of an organosilicon resin having 35 mol percent

units, 20 mol percent diphenylsiloxane, 30 mol percent monomethylsiloxane units, 5 mol percent

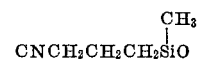

units, and 10 mol percent monoisopropylsiloxane units and having 10 weight percent silicon-bonded hydroxyl radicals,
25 parts by weight tungsten disulfide,
25 parts by weight powdered nickel,
1 part by weight triethylenediamine.

(E)

3 parts by weight of the hydroxylated organopolysiloxane resin as described in Example 1,
20 parts by weight molybdenum disulfide,
4.25 parts by weight of bronze powder,
60 parts by weight silica aerogel,
12.75 parts by weight titanium dioxide, and
0.15 part by weight triethylenediamine.

(F)

25 parts by weight of an organosilicon polymer having 10 mol percent

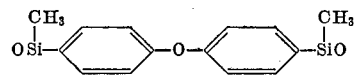

units, 40 mol percent dimethylsiloxane units, 30 mol percent monoethylsiloxane units, 5 mol percent $SiO_2$ units and 15 mol percent octadecylmethylsiloxane units and having 2 weight percent silicon-bonded hydroxyl radicals,
30 parts by weight zinc sulfide,
7.5 parts by weight aluminum powder,
25 parts by weight titanium dioxide,
12.5 parts by weight crushed quartz,
0.25 part by weight triethylenediamine, and
0.25 part by weight 2-ethyl-4-methylimidazole.

(G)

40 parts by weight of an organopolysiloxane resin having 25 mol percent monomethylsiloxane units, 20 mol percent monophenylsiloxane units, 20 mol percent $SiO_2$ units, and 10 mol percent trimethylsiloxane units and having 3.6 weight percent silicon-bonded hydroxyl radicals,
20 parts by weight molybdenum disulfide,
20 parts by weight zinc sulfide,
10 parts by weight boron nitride,
10 parts by weight stainless steel powder, and
2.8 parts by weight triethylenediamine.

(H)

40 parts by weight of the organopolysiloxane resin as described in (G) above.

20 parts by weight of an organosilicon polymer of the formula

20 parts by weight of zinc powder,
20 parts by weight of diatomaceous earth, and
0.6 part by weight triethylenediamine.

(I)

30 parts by weight of the hydroxylated organopolysiloxane as described in Example 1,
5 parts by weight of an organosilicon polymer of the formula

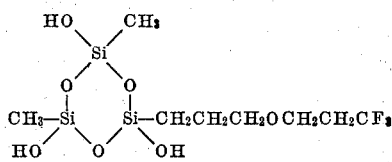

40 parts by weight molybdenum disulfide
8.75 parts by weight copper powder,
15 parts by weight glass fibers,
1.25 parts by weight iron oxide, and
0.7 part by weight triethylenediamine.

(J)

5 parts by weight of the hydroxylated organopolysiloxane resin as described in Example 1,
95 parts by weight tungsten disulfide, and
0.01 part by weight triethylenediamine.

That which is claimed is:

1. A curable composition consisting essentially of:
   (A) an organosilicon polymer having silicon atoms linked by divalent radicals selected from the group consisting of divalent oxygen atoms, divalent hydrocarbon radicals, divalent halogenated hydrocarbon radicals, divalent ether containing hydrocarbon radicals, and divalent ether containing halogenated hydrocarbon radicals, said divalent ether containing radicals being bonded to the silicon atoms by silicon-carbon bonds, at least 0.25 weight percent of the organosilicon polymer being hydroxyl radicals bonded to silicon atoms and any remaining unsatisfied valances of the silicon atoms being satisfied by monovalent organic radicals selected from the group consisting of hydrocarbon radicals, halogenated hydrocarbon radicals, cyanoalkyl radicals, ether containing hydrocarbon radicals and ether containing halogenated hydrocarbon radicals, said monovalent ether containing radicals being bonded to the silicon atoms through silicon-carbon bonds, there being an average of at least 0.75 monovalent organic radicals per silicon atom,
   (B) an acidic filler selected from the group consisting of molybdenum disulfide, zinc sulfide, boron nitride tungsten disulfide, zinc oxide, nickel powder, aluminum powder, zinc powder, bronze powder, copper powder, stainless steel powder and mixtures thereof, (A) being present in an amount of from 3 to 90 weight percent based on the total weight of (A) and (B) and (B) being present in an amount of from 10 to 97 weight percent based on the total weight of (A) and (B), and
   (C) a compound selected from the group consisting of triethylenediamine and 2-ethyl-4-methylimidazole, (C) being present in an amount of from 0.1 to 10 weight percent based on the weight of (A).

2. The curable composition in accordance with claim 1 in which the acidic filler (B) is a mixture of molybdenum disulfide and zinc sulfide.

3. The curable composition in accordance with claim 1 in which the acidic filler is molybdenum disulfide.

4. The curable composition in accordance with claim 1 in which the acidic filler is zinc sulfide.

5. The curable composition in accordance with claim 1 in which compound (C) is triethylenediamine.

6. The curable composition in accordance with claim 1 in which compound (C) is 2-ethyl-4-methylimidazole.

7. The curable composition in accordance with claim 2 in which compound (C) is triethylenediamine.

8. The curable composition in accordance with claim 3 in which compound (C) is triethylenediamine.

9. The curable composition in accordance with claim 1 in which the organosilicon polymer (A) has silicon atoms linked by a divalent oxygen atoms, at least 1 weight percent of the organosilicon polymer being hydroxyl radicals bonded to silicon atoms, any remaining valences of the silicon atom being satisfied by monovalent organic radicals selected from the group consisting of methyl, vinyl, ethyl, isopropyl and phenyl, and there being an average of at least one monovalent organic radical per silicon atom.

10. The curable composition in accordance with claim 9 in which the monovalent organic radicals include both methyl and phenyl radicals.

11. The curable composition in accordance with claim 9 in which the acidic filler (B) is a mixture of molybdenum disulfide and zinc sulfide and compound (C) is triethylenediamine.

12. The curable composition in accordance with claim 10 in which the acidic filler is a mixture of molybdenum disulfide and zinc sulfide.

13. The curable composition in accordance with claim 9 in which the organosilicon polymer (A) is an organopolysiloxane resin.

14. The curable composition in accordance with claim 10 in which the organosilicon polymer (A) is an organopolysiloxane resin.

15. The curable composition in accordance with claim 13 in which the organopolysiloxane resin has an average of from 1 to 1.7 monovalent organic radicals per silicon atom.

16. The curable composition in accordance with claim 14 in which the organopolysiloxane resin has an average of from 1 to 1.7 monovalent organic radicals per silicon atom.

17. The curable composition in accordance with claim 15 in which the acidic filler (B) is a mixture of molybdenum disulfide and zinc sulfide and compound (C) is triethylenediamine.

18. The curable composition in accordance with claim 16 in which the acidic filler (B) is a mixture of molybdenum disulfide and zinc sulfide and compound (C) is triethylenediamine.

19. The curable composition in accordance with claim 1 in which (A) is present in amounts of from 5 to 50 weight percent based on the total weight of (A) and (B), (B) is present in amounts of from 50 to 95 weight percent based on the total weight of (A) and (B), and (C) is present in amounts of from 0.2 to 5 weight percent based on the weight of (A).

20. The curable composition in accordance with claim 19 in which the acidic filler (B) is a mixture of molybdenum disulfied and zinc sulfide.

21. The curable composition in accordance with claim 19 in which compounds (C) is triethylenediamine.

22. The curable composition in accordance with claim 20 in which compounds (C) is triethylenediamine.

23. The curable composition in accordance with claim 9 in which (A) is present in amounts of from 5 to 50 weight percent based on the total weight of (A) and (B), (B) is present in amounts of from 50 to 95 weight percent based on the total weight of (A) and (B), and (C) is present in amounts of from 0.2 to 5 weight percent based on the weight of (A).

24. The curable composition in accordance with claim 23 in which the acidic filler (B) is a mixture of molybdenum disulfide and zinc sulfide and compound (C) is triethylenediamine.

25. The curable composition in accordance with claim 23 in which the organosilicon polymer is an organopolysiloxane resin.

26. The curable composition in accordance with claim 25 in which the organopolysiloxane resin has an average of from 1 to 1.7 monovalent organic radicals per silicon atom, said monovalent organic radicals include both methyl and phenyl radicals, the acidic filler (B) is a mixture of molybdenum disulfide and zinc sulfide and compound (C) is triethylenediamine 27. The curable composition in accordance with claim 1 in which there is present in addition to the acidic filler, other fillers in amounts of up to 75 weight percent of the total filler content.

28. The curable composition in accordance with claim 27 in which the other fillers are present in amounts up to 50 weight percent of the total filler content.

29. The curable composition in accordance with claim 1 in which organic polymers are present in combination with the organosilicon polymer (A).

30. The curable composition in accordance with claim 27 in which the other filler is selected from a group consisting of silica, titanium dioxide, aluminum oxide, diatomaceous earth, crushed quartz, glass fillers, iron oxide, graphite, carbon black and clay.

References Cited

UNITED STATES PATENTS

| | | |
|---|---|---|
| 2,683,673 | 7/1954 | Silversher. |
| 2,721,857 | 10/1955 | Dickmann. |
| 3,280,071 | 10/1966 | Beck. |
| 3,294,732 | 12/1966 | Nitzsche et al. |
| 3,328,481 | 6/1967 | Vincent. |

MORRIS LIEBMAN, Primary Examiner

L. T. JACOBS, Assistant Examiner